Sept. 15, 1942. B. C. PLACE 2,295,685
SHEET METAL NUT OR THE LIKE
Filed Aug. 16, 1940 2 Sheets-Sheet 1

Inventor
Bion C. Place

By Strauch & Hoffman
Attorneys

Sept. 15, 1942.  B. C. PLACE  2,295,685
SHEET METAL NUT OR THE LIKE
Filed Aug. 16, 1940  2 Sheets-Sheet 2
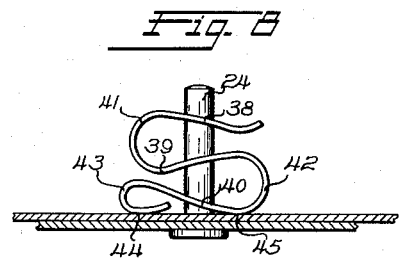
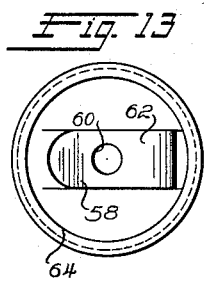
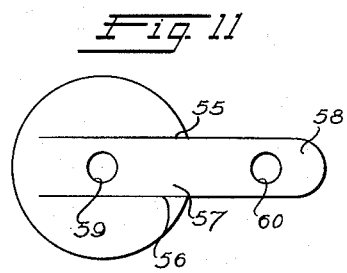
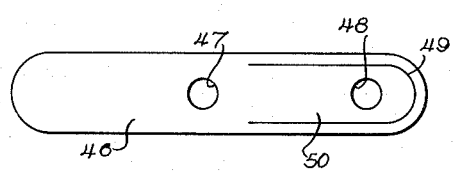
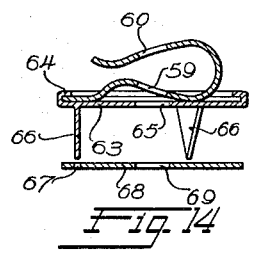
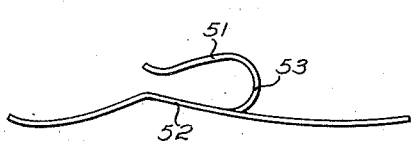
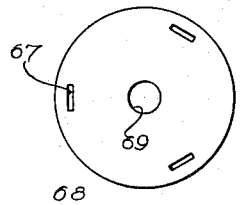
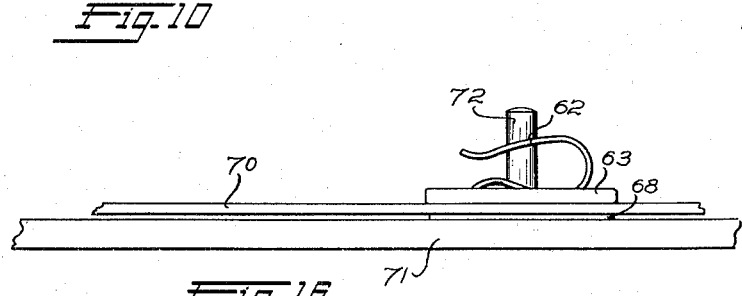
Inventor
Bion C. Place
By Strauch & Hoffman
Attorneys

UNITED STATES PATENT OFFICE 2,295,685

SHEET METAL NUT OR THE LIKE

Bion C. Place, Detroit, Mich., assignor of one-half to George E. Gagnier, Detroit, Mich.

Application August 16, 1940, Serial No. 352,956

13 Claims. (Cl. 85—36)

The present invention relates to a sheet metal nut or the like designed to firmly engage the threaded or unthreaded shank of a bolt or pin and designed to be slid along said shank to its holding position.

Sheet metal nuts or fastening means designed to engage the threaded or unthreaded shank of a bolt or pin, as heretofore constructed, have the serious disadvantage that the sheet metal nut or fastening means cannot be disengaged from the shank of the bolt or pin except with great difficulty, and then generally only with damage to the nut or fastening means preventing the re-use thereof. Furthermore, sheet metal nut-like fastening means, as heretofore proposed, are difficult to apply by relative straight-line movement of the nut along the shank of the bolt or pin in a manner so that there is a complete absence of looseness in the connection provided by the bolt or pin.

The primary purpose of the present invention is to provide an improved sheet metal nut-like fastener that can readily be assembled on the shank of a bolt or pin by simply sliding the nut into proper position on the shank and in which the nut is shaped so that a part thereof may be readily manipulated to take up all looseness between the head of the bolt or pin and the nut, and so that other portions may easily be brought into firm gripping engagement with, or disengaged from, the shank of the bolt or pin by manipulation thereof.

A further object of the invention is to provide a sheet metal nut that may be produced from a single strip of resilient metal by bending the strip between its ends to form a C-like hinge and by perforating and disposing the portions connected by said hinge in a manner permitting the shank of the bolt or pin to be readily slid through the perforations or to grip said shank firmly at the will of the person applying or removing the nut.

A still further object of the invention is to provide a sheet metal nut made of resilient metal, and including converging juxtaposed portions having approximately aligned apertures having a diameter essentially equal to the diameter of the shank of the bolt or pin with which the nut is to be used.

A further object of the invention is to provide a sheet metal nut that consists of two overlying resiliently united portions each of which has a perforation formed therein in a manner so that the wall of the aperture is normal to the penetrated surfaces thereof, and in which said portions are normally so related that the apertures are only approximately in alignment but arranged to be brought into exact alignment by movement of said portions with respect to the resilient connection that unites them.

A still further object of the invention is to provide an improved fastening means designed to be readily engaged with an unthreaded shank, and consisting of two resiliently united apertured portions arranged so that, in untensioned relation, said portions are convergingly disposed and when applied to the shank have a tendency to assume acute angles to the longitudinal axis of said shank causing the upper and lower corners of the apertured walls of said portions to firmly grip the shank at opposite sides thereof and thus fixedly secure the nut to the shank.

A still further object of the invention is to provide a sheet metal nut having overlying apertured portions disposed in convergent relation and end portions shaped to permit the entry of a tool or a finger between said portions to permit them to be moved toward parallelism so as to bring the apertures in said portions more or less into alignment and to permit the nut to be freely slid into position at the proper point along the length of the shank of a threaded or unthreaded bolt or pin.

This invention also aims to provide an improved fastening means to engage the shank of a stud, such as the stud utilized in securing curtains or the like, which permits the stud to be relatively freely engaged with the fastening means, though the latter, when engaged, extend at acute angles to the longitudinal axis of the shank and firmly grip the bolt at opposite sides of the shank when the fastening means is in its holding position.

Still further objects of the invention will appear as the description thereof proceeds with reference to the accompanying drawings, in which:

Figure 4 is a longitudinal sectional view on an enlarged scale showing how the nut portions engage the shank of the headed pin or the like;

Figure 8 is a side elevational view of a still further modified form of nut including the present invention;

Figure 9 is a plan view of a blank from which a still further modified form of nut may be made;

Figure 10 is a side elevational view of a modified form of nut constructed from the blank illustrated in Figure 9;

Figure 11 is a plan view of a blank from which a modified form of nut-like fastener intended to cooperate with the stud of a curtain fastener may be formed;

Figure 12 is an elevational view of the fastener formed from the blank of Figure 11;

Figures 13 and 14 are, respectively, plan and exploded views of a curtain fastener including the nut-like fastener arrangement of Figures 11 and 12;

Figure 15 is a plan view of the fastener plate, preferably forming a part of the curtain fastener illustrated in Figures 13 and 14; and Figure 16 is a side elevational view showing the manner of use of the curtain fastener of Figures 11–15, inclusive.

Like reference characters indicate like parts throughout the several figures.

The sheet metal nut of the present invention in its preferred form, illustrated in Figures 1–6, inclusive, is constructed from an elongated strip of sheet metal which is tempered to provide it with the desired resilience, preferably after the strip has been bent into the form illustrated in said figures. In its completed form the nut comprises overlying portions 16 and 17 connected by a C-like hinge portion 18 constituting a part of the mid-portion of the strip. The C-shaped portion 18 provides an open spring hinge resiliently uniting the overlying portions 16 and 17 which are provided with apertures 19 and 20, respectively. The apertures 19 and 20 are punched into the blank preferably before it was bent into the form already described, and while said blank is still in flat form so that the apertures may be formed with the walls thereof normal to the surfaces of the strip penetrated thereby.

Figure 4:
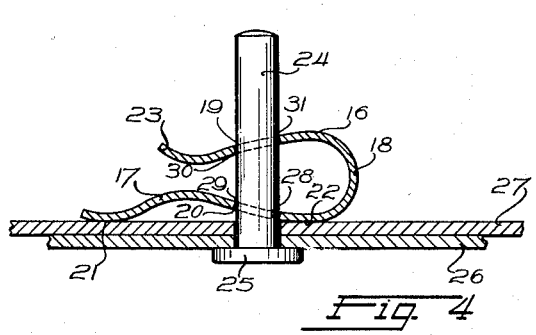

The portion 17 has the body thereof preferably bent toward the overlying portion 16 and the portion 16 is, in the untensioned form of the nut, bent downwardly toward the portion 17, the bends in the portions 16 and 17 being so arranged that the portion 16 containing the aperture 19 converges downwardly toward the underlying portion 17, so that the part of portion 17 that contains the aperture 20 converges upwardly toward the overlying portion 16, as illustrated particularly in Figure 4 of the drawings. The portion 17 is formed to provide bearing portions 21 and 22, the latter adjacent the hinge portion 18 and the former at the free end of said portion. Preferably the free end of portion 16 is bent upwardly away from the underlying portion 17 as indicated at 23 for a purpose hereinafter to be described.

Figure 5:
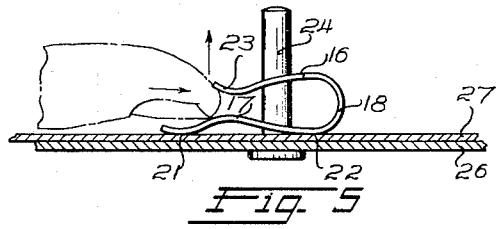
Figure 5 is an elevational view illustrating the manner in which the nut of the present invention may be manipulated to readily release it from its engagement with the shank of the pin.
Figure 6:
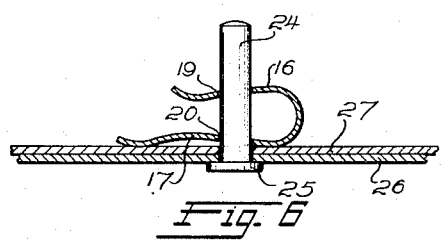
Figure 6 is a sectional view showing the nut of the present invention in tensioned condition with the parts thereof distorted so as to bring the apertures in the nut portions into exact alignment, this view illustrating clearly the capability of the nut to be brought into a form in which engagement or disengagement with the shank may be brought about even without substantial friction.
Figure 3:
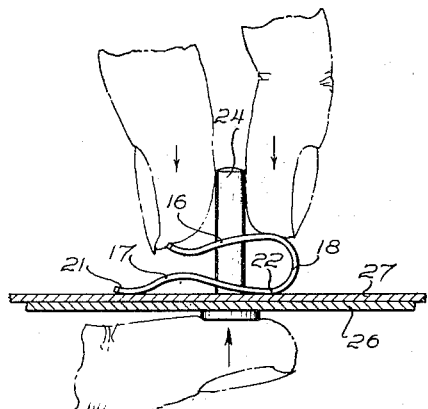
Figure 3 is an elevational view showing the nut of Figures 1 and 2 engaging the unthreaded shank of a headed pin and illustrating the manner of application of the nut to the pin.

The mode of use of the sheet metal nut, the structure of which has just been described, is made clear in Figures 3, 4, 5 and 6 in which the nut is shown applied to the shank 24 of a pin having a head 25 bearing against a structure 26, the shank 24 being passed through a perforation in said structure. A further structure 27 rests on the structure 26 and is to be secured thereto by means of the headed pin and nut of the present invention. The structure 27 likewise has a perforation through which the shank 24 is passed after the structures are in juxtaposition. The nut of the present invention is applied to the shank 24 by passing the end of the shank through the approximately aligned apertures 19 and 20 in the nut and applying pressure against the nut to slide it along the shank toward the structure 27, as illustrated in Figure 3. In applying pressure to the nut in moving it toward the structure 27, the portions 16 and 17 are caused to be bent toward a position at which said portions would be parallel with each other, and which is illustrated in Figure 6 of the drawings. When the portions 16 and 17 are distorted so that they approach a position such as illustrated in Figure 6, apertures 19 and 20 therein are accurately in alignment and it is possible to slide the nut on and off the shank 24. In practice, since the nut in untensioned form assumes the shape illustrated in Figure 2, it will be understood that distortion of the nut is necessary against a tendency to return to its original form in order to bring the nut to the form illustrated in Figure 6 and in which the nut can be perfectly freely slid on and off the shank 24. It will be understood that it is not necessary that the portions 16 and 17 be actually parallel to each other in order to get the nut on the shank. It is only necessary that the parts be brought toward parallelism sufficiently to permit the shank 24 to pass through the apertures which are out of exact alignment when the nut is in its untensioned condition illustrated in Figures 1 and 2. In sliding the nut on the shank 24 by endwise pressure, the passage of the shank through the approximately aligned apertures has a tendency to separate the portions 16 and 17 against their inherent tension and to cause them to move toward the position of parallelism. The pressure, exerted against the end of the nut in the manner illustrated in Figure 3, likewise has a tendency to flatten the portions 16 and 17 temporarily permitting the nut to be relatively freely slid along the shank until it abuts against the structure 27. Preferably sufficient pressure is exerted against the portion of the nut to insure at least substantial flattening of the underlying portion 17. When the nut has been firmly pressed toward the structure 27, the pressure thereagainst is released and the nut has a tendency to resume its original form, and the flattened portion 17 moves away from the structure 27 causing the opposite corners 28 and 29 to firmly grip the shank at opposite sides. Similarly the portion 16 assumes an increased angular relation with respect to the longitudinal axis of the shank causing the corners 30 and 31 of the aperture 19 to firmly engage the shank 24 at opposite sides thereof. The portion 17 thus serves to draw the head 25 toward the structure 26 and exerts a pressure maintaining the superimposed structures 26 and 27 firmly in contact, while portion 16 strongly bites into or frictionally engages the shank very firmly. Movement of the nut along the shank of the head of the pin is accordingly prevented by engagement of the corners 28, 29, 30 and 31 with the shank of the bolt.

It may be observed that the overlying portion 16, in particular, grips the shank more firmly in proportion to the extent that it is angularly disposed with respect to the longitudinal axis of the shank. It is intended that the nut be constructed of material having sufficient resilience and that the angle, at which the portion 16 is disposed, in particular, shall be so designed that the nut will grip the shank of the pin with the force necessary to absolutely prevent movement of the nut away from the structure 27 once it is engaged therewith in the manner already described. It will be observed that, if force is exerted tending to move the structure 27 away from the structure 26, thus applying pressures inside the nut against the bearing portions 22 and 21 of the nut, the grip of the nut on the shank is proportionately increased because, when said pressure is thus exerted, the angularity of the portion 16 with respect to the longitudinal axis of the shank is increased. It has been found accordingly that, once the nut of the present invention is applied to the shank, it engages the shank with exceptional tenacity preventing accidental or inadvertent disengagement of the nut from said shank, even if the shank is unthreaded. Of course, it will be understood that the nut of the present invention is capable of application to a bolt having a threaded shank, in the same manner as other heretofore proposed sheet metal nuts, though one of the advantages of the present invention is that it is not necessary that the shank be threaded in order to prevent sliding movement of the nut away from the structure 27 under the action of forces applied from the side of the nut adjacent the structure 27.

Nevertheless, when it is desired for any reason to disassemble the elements held together by the nut of the present invention, it is possible to do so by proceeding in the manner illustrated in Figure 5. To effect release of the nut, the end of a finger or thumb is simply wedged between the portion 23 and the overlying free ends of the nut. Or, if desired, a proper tool may be utilized for this purpose when the nut is constructed of relatively heavy materials. In wedging the end of a finger, thumb or tool between the free ends of the nut, it will be readily seen that the portions 16 and 17 are thereby bent or distorted toward a position at which they are in parallelism or approximate parallelism when, as is made clear from Figure 6, the nut may be readily withdrawn without injury to either the shank or to the nut, it being capable of being replaced on the shank when it is again desired to reassemble the structure in the manner heretofore described.

Figure 1:
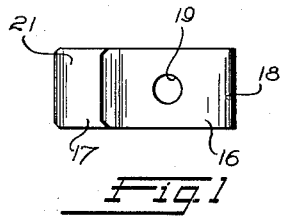
Figures 1 and 2 are top plan and edge elevational views, respectively, of a preferred form of sheet metal nut-like fastener.
Figure 2:
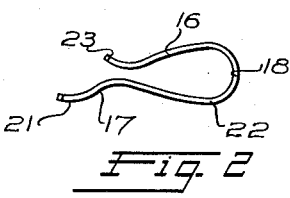
Figure 2A:
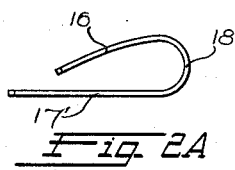
Figure 2a is a view similar to Figure 2 but showing a modified formation of the nut of Figures 1 and 2 having some of the advantages of the latter.

In Figure 2a a modified form of nut is illustrated in which the underlying portion 17' containing the aperture 20 is made flat rather than cambered as in the form first described. The overlying portion 16 still converges toward the straight underlying portion 17'. This form of the invention is applied in the manner already described, though, in this form, the inclination of portion 16 is relied upon to grip the shank which can readily be passed through the aperture in the portion 17' inasmuch as the walls of said aperture are perpendicular to said straight portion. The modified form of the nut illustrated in Figure 2a does not have as tenacious an engagement with the shank and it does not have as strong a tendency to hold the juxtaposed structures in contact and to draw the head of the bolt or pin toward said structures, advantages that are contributed to the assembly when the nut in the preferred form, and including the curved portion 17 bent away from the structure at the aperture therein, is utilized.

Figure 7:
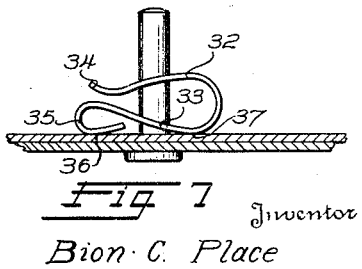
Figure 7 is an elevational view showing a modified form of nut applied to its headed pin illustrated as securing two overlying structures in juxtaposition.

The nut of the present invention may be constructed in other ways. For example, in Figure 7 a further modified form of nut is shown consisting of overlying portions 32 and 33 having approximately aligned apertures formed in the manner already described with respect to the preferred form of the invention. The overlying portion 32 has an upwardly flared end 34 and the free end of the portion 33 is bent downwardly and inwardly as shown at 35 providing a bearing portion 36 in alignment with the bearing portion 37 of the underlying portion 33. A nut constructed in this form may be applied or removed from a threaded or unthreaded shank in the manner already fully described with respect to the preferred form of the invention.

A further modified form of nut including the present invention is illustrated in Figure 8 and comprises overlying portions 38, 39 and 40 connected by C-like spring hinges 41 and 42. The nut of this form of the invention is formed by bending a strip of metal back and forth. Apertures are formed in portions 38, 39 and 40 so that their walls are at right angles to the surfaces, penetrated in forming the apertures. Said apertures are in approximate alignment. The one free end of the strip 38 is preferably bent upwardly as illustrated and the other free end 43 is bent under providing a bearing surface 44 in alignment with the bearing surface 45 provided by one edge of the hinge 42. The form of nut illustrated in Figure 8 is applied and removed from the shank in the manner already described, it being understood that, in this form of the invention, the nut grips the threaded or unthreaded shank at six points rather than four as in that first described.

A still further modified form of the invention is illustrated in Figures 9 and 10 illustrating a blank consisting of a strip of sheet material 46 having apertures 47 and 48 formed therein so that the walls thereof are perpendicular to the surfaces penetrated in the formation of said apertures. A U-shaped incision 49 is cut in the strip separating a tongue 50 from the body of the strip. Said tongue is bent upwardly and over the body of the strip as illustrated so as to provide overlying portions 51 and 52 connected by a C-like hinge portion 53. The nut just described is used in a manner and functions substantially like that first described as will be apparent.

In the form of the invention illustrated in Figures 11 and 12 the nut-like structure comprises a circular or disc-like body 54 having parallel incisions 55 and 56 cut therein from one edge separating a portion 57 constituting a continuation of a tongue-like extension 58 of said body. Perforations 59 and 60, formed in the portions 57 and 58, respectively, are punched in the blank illustrated in Figure 11 before the tongue 58 is bent into overlying relation to the portion 57, as illustrated in Figure 12. In forming the fastener portion 57 is bent out of the plane of the body 54 providing an underlying portion 61 which functions to complement the overlying portion 62 formed by bending the tongue 58 over the body of the blank as already stated. It will readily be understood that the perforations 59 and 60 are in substantial alignment when the nut-like fastener assumes the form illustrated in Figure 12.

The nut-like fastener of Figures 11 and 12 is well adapted for use as a part of a curtain fastener, and when so used it is preferably assembled in an encasing member 63, the margins 64 of which are bent around the disc-like body 54 to hold the fastener in assembled relation to said casing. The latter has an aperture 65 in alignment with the apertures 59 and 60 of the fastening device. Protruding from the underside of the casing 63 are a multiplicity of pointed tongues 66, which are arranged to penetrate the curtain to which the fastener is applied and to be passed through apertures 67 in a plate 68 having an aperture 69 through which the stud of the cooperating fastener may be passed in a manner presently to be described. The disc-like securing plate 68 is applied to the side of the curtain opposite from that against which the casing 63 bears and the tongues 66 are passed through the curtain and through the apertures 67 in said plate-like member and clenched thereby fixedly securing the fastener to the curtain. It will be understood that other means of attaching the fastener to the curtain may be provided.

The mode of use of the arrangement illustrated in Figures 11 to 15, inclusive, will be clear from Figure 16, in which 70 is a curtain having the fastener of Figure 12 in a casing 63 fixedly secured to the curtain by means of tongues clenched around a securing plate 68 applied to the other side of the curtain. 71 indicates the strut or support against which the curtain is to be secured by attachment to a stud 72 protruding from said strut or support.

In applying the curtain the stud 72 is passed through the aligned apertures 69, 65 and engaged with the aperture walls 59 and 60 of the fastener in the manner already described with reference to the nuts heretofore referred to. It will be appreciated that securing of the curtain to the stud may easily be brought about and that when disengagement is desired all that is necessary is to manually separate the portions 62 and 61 so as to bring the apertures therein into alignment then the curtain may be readily disengaged from the stud 72.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letter Patent is:

1. A sheet metal spring nut, comprising a strip of resilient metal bent intermediate its ends to cause end portions of the strip to lie one above the other in spaced relation, said portions converging toward each other and provided with apertures having unbroken walls normal to flat top and bottom surfaces of said portions, one of said portions being shaped to provide external bearing surfaces disposed at opposite sides of the aperture therein in a common plane perpendicular to a line passing through the centers of said apertures.

2. A sheet metal spring nut, comprising a strip of resilient metal bent intermediate its ends to cause end portions of the strip to lie one above the other in spaced relation, said portions converging toward each other and provided with apertures having unbroken walls normal to flat top and bottom surfaces of said portions, one of said portions being longer than the other, the latter portion being shaped to provide external bearing surfaces disposed at opposite sides of the aperture therein in a common plane perpendicular to a line passing through the centers of said apertures.

3. A sheet metal spring nut, including two convergently-disposed overlying flat portions having approximately aligned apertures having a diameter substantially equal to the diameter of the shank of the bolt or pin with which the nut is to be used, one of said portions being shaped to provide external bearing surfaces disposed at opposite sides of the aperture therein in a common plane perpendicular to a line passing through the centers of said apertures.

4. A sheet metal spring nut, comprising a plurality of resiliently hingedly united portions arranged one above the other in inclined and spaced relation, said portions having apertures arranged in flat parts of said portions so the walls thereof align when said portions are moved into approximate parallelism, said walls being angularly disposed when said portions are in inclined relation, one of said portions being curved beyond the aperture therein away from the other portion to provide a bearing surface in a plane perpendicular to a line passing through the centers of said apertures.

5. A sheet metal spring nut, comprising a pair of flat portions resiliently hingedly united at one end and free to move toward and from each other at the other end, said portions being arranged one above the other in inclined and spaced relation, said portions having apertures providing unbroken walls that align when said portions are moved into approximate parallelism, said walls being angularly disposed when said portions are in inclined relation one of said portions being curved beyond the aperture therein away from the other portion to provide a bearing surface in a plane perpendicular to a line passing through the centers of said apertures.

6. Fastening means, consisting in an unthreaded shank and a nut engaged on said shank, said nut including two resiliently hingedly united apertured flat portions, each portion extending transversely of said shank and arranged at an acute angle to the axis of said shank whereby the upper and lower corners of the aperture walls of said portions firmly engage said shank at opposite sides thereof, one of said portions being shaped to provide external bearing surfaces disposed at opposite sides of the aperture therein in a common plane perpendicular to a line passing through the centers of said apertures.

7. Fastening means consisting of a bolt having a shank and an apertured sheet metal nut slidably engaged on said shank, said nut comprising a strip of metal bent at a mid-portion to provide yieldingly-connected overlying spaced portions having apertures receiving said shank, said portions being flat and converging from said bend, said apertures being formed in said flat portions so that the walls thereof are normal to the top and bottom surfaces of said strip, whereby when said portions are disposed in convergent relation corners formed by said walls at said top and bottom surfaces firmly grip said shank, one of said portions being shaped to provide external bearing surfaces disposed at opposite sides of the aperture therein in a common plane perpendicular to a line passing through the centers of said apertures.

8. A sheet metal fastener formed to be distorted and slid on a shank and to grip the shank when released, comprising a sheet metal strip in untensioned condition having a mid-portion bent to provide a C-like hinge and end portions that converge in a direction away from said hinge, and approximately aligned apertures in said portions, said apertures being formed so that the walls thereof are perpendicular to flat top and bottom surfaces of said portions whereby when said portions are separated and brought into substantial parallelism said apertures may be aligned permitting the fastener to be freely slid on said shank, said portions being shaped to facilitate entry of a finger or tool between the extreme ends thereof.

9. A one-piece sheet metal nut having a C-like hinge connecting two apertured portions that converge in a direction away from said hinge, one of said portions terminating in a downwardly curved end and the other portion terminating in an upwardly curved end, the apertures in said portions having walls perpendicular to flat top and bottom surfaces thereof.

10. A one-piece sheet metal nut having a C-like hinge connecting two apertured portions that converge in a direction away from said hinge, one of said portions being bent at its end to provide a bearing surface in alignment laterally with the bearing surface provided by said hinge on the secured structure, the apertures in said portions having walls perpendicular to flat top and bottom surfaces thereof.

11. A sheet metal fastener formed to be distorted and slid on a shank and to grip the shank when released, comprising a piece of resilient metal having its mid-portion curved upwardly and end portions disposed in the same plane to provide surfaces to bear against the structure secured by the fastener, and a tongue struck from said piece and bent over said mid-portion and then downwardly so that a part of said tongue and a part of said portion are in convergent spaced relation, and apertures formed in said parts so that the walls thereof are perpendicular to the penetrated surfaces of said portion and tongue.

12. A sheet metal fastener formed to be distorted and slid on a shank and to grip the shank when released, comprising a flat strip of metal bent back and forth to provide a multiplicity of overlying portions, each of said portions converging from one edge toward the opposite edge with respect to the adjacent overlying portion, and approximately aligned apertures in said portions, each aperture being formed so that the walls thereof are perpendicular to the penetrated surfaces of the portion that contains it, said fastener including portions providing external bearing surfaces in the same plane at opposite sides of the approximately aligned apertures.

13. A one-piece sheet metal spring nut comprising at least two resiliently hingedly connected portions disposed in spaced relation, said portions inclining toward each other and having approximately aligned apertures having a diameter substantially equal to the diameter of the shank of the bolt or pin with which the nut is to be used, said portions being flat around the peripheries of said apertures, one of said portions being shaped to provide external bearing surfaces disposed at opposite sides of the aperture therein in a common plane perpendicular to a line passing through the centers of said apertures.

BION C. PLACE.